(12) United States Patent
Vincent et al.

(10) Patent No.: US 11,412,377 B2
(45) Date of Patent: Aug. 9, 2022

(54) METHOD OF CONFIGURING A MULTIMEDIA DEVICE INTENDED TO BE CONNECTED TO AN INTERCONNECTION DEVICE

(71) Applicant: Orange, Paris (FR)

(72) Inventors: Yoann Vincent, Cachan (FR); Dimitri Bricheteau, Rennes (FR)

(73) Assignee: ORANGE, Issy-les-Moulineaux (FR)

( * ) Notice: Subject to any disclaimer, the term of this patent is extended or adjusted under 35 U.S.C. 154(b) by 138 days.

(21) Appl. No.: 15/528,070

(22) PCT Filed: Nov. 19, 2015

(86) PCT No.: PCT/FR2015/053140
§ 371 (c)(1),
(2) Date: May 18, 2017

(87) PCT Pub. No.: WO2016/079442
PCT Pub. Date: May 26, 2016

(65) Prior Publication Data
US 2017/0311156 A1    Oct. 26, 2017

(30) Foreign Application Priority Data

Nov. 20, 2014 (FR) ........................... 1461259

(51) Int. Cl.
*H04W 12/06* (2021.01)
*H04L 12/46* (2006.01)
(Continued)

(52) U.S. Cl.
CPC ......... *H04W 12/04* (2013.01); *H04L 12/4625* (2013.01); *H04W 12/06* (2013.01);
(Continued)

(58) Field of Classification Search
CPC ....... H04W 12/04; H04W 12/08; H04W 4/06; H04W 84/12; H04W 12/00;
(Continued)

(56) References Cited

U.S. PATENT DOCUMENTS 9,554,061 B1\* 1/2017 Proctor, Jr. ......... H04L 12/2838
10,111,025 B2\* 10/2018 Kang .................... H04W 12/08
(Continued)

FOREIGN PATENT DOCUMENTS

EP          2658334        10/2013
WO    WO 2006/106393      10/2006
(Continued)

OTHER PUBLICATIONS

International Search Report and Written Opinion dated Feb. 10, 2016 for Application No. PCT/FR2015/053140.

*Primary Examiner* — Alexander Lagor
*Assistant Examiner* — D'Arcy Winston Straub
(74) *Attorney, Agent, or Firm* — Knobbe, Martens, Olson & Bear, LLP (57) ABSTRACT

A method of configuring a multimedia device connected to an interconnection device and to at least one terminal is disclosed. The multimedia device includes a service interface to the interconnection device and a terminal interface to said terminal. The method includes an initialization phase including receiving, through the service interface, a first request to obtain an identification parameter authorizing access to a configuration module for the multimedia device, and transmitting, through the service interface, a message destined for the terminal comprising the identification parameter requested. The method includes a configuration phase including identifying the interface through which a second request to access the configuration module is received, sending to the terminal a third request through the
(Continued)

terminal interface when the second request is received through the terminal interface for transmission of the identification parameter, and receiving, through the terminal interface, a message sent by the terminal including the identification parameter.

14 Claims, 3 Drawing Sheets

(51) Int. Cl.
| | | |
|---|---|---|
| *H04W 12/37* | (2021.01) | |
| *H04W 12/50* | (2021.01) | |
| *H04W 12/08* | (2021.01) | |
| *H04W 84/12* | (2009.01) | |
| *H04W 12/04* | (2021.01) | |
| *H04W 4/06* | (2009.01) | |

(52) U.S. Cl.
CPC ........... *H04W 12/08* (2013.01); *H04W 12/37* (2021.01); *H04W 12/50* (2021.01); *H04W 4/06* (2013.01); *H04W 84/12* (2013.01)

(58) Field of Classification Search
CPC . H04W 12/003; H04W 12/004–00407; H04W 12/06–0608; H04W 12/37; H04W 12/50; H04N 21/436–43615; G06F 21/30–305; G06F 21/31; G06F 21/42; G06F 21/43; G06F 21/44; H04L 12/4625
See application file for complete search history.

(56) References Cited

U.S. PATENT DOCUMENTS

| | | | | |
|---|---|---|---|---|
| 10,114,939 | B1* | 10/2018 | Bhalerao | ................. G06F 21/44 |
| 2011/0298596 | A1* | 12/2011 | Warrick | ........... H04N 21/42206 340/12.53 |
| 2013/0091279 | A1* | 4/2013 | Haddad | ................. H04W 12/06 709/225 |
| 2013/0309971 | A1* | 11/2013 | Kiukkonen | ........... H04L 63/107 455/41.2 |
| 2013/0311694 | A1* | 11/2013 | Bhamidipati | ..... H04M 1/72412 710/303 |
| 2015/0223068 | A1* | 8/2015 | Thelen | .................... H04L 63/08 726/7 |
| 2019/0215561 | A1* | 7/2019 | Dua | ............... H04N 21/440218 |

FOREIGN PATENT DOCUMENTS

| | | |
|---|---|---|
| WO | WO 2012/052660 | 4/2012 |
| WO | WO 2014/014457 | 1/2014 |

* cited by examiner (PRIOR ART)

METHOD OF CONFIGURING A MULTIMEDIA DEVICE INTENDED TO BE CONNECTED TO AN INTERCONNECTION DEVICE

RELATED APPLICATIONS

This application is the U.S. National Phase of Application No. PCT/FR2015/053140 entitled "METHOD OF CONFIGURING A MULTIMEDIA DEVICE INTENDED TO BE CONNECTED TO AN INTERCONNECTION DEVICE" filed Nov. 19, 2015, which designated the United States, and which claims the benefit of French Application No. 1461259 filed Nov. 20, 2014.

The invention is situated in the field of telecommunications, and more particularly in the field of home networks.

With the development of portable devices such as smartphones and other digital tablets, as well as the dematerialization of content such as pieces of music, films or even photographs, users of such devices are developing the habit of sharing this content.

A user wishing to share multimedia content stored on one of his devices may thus be prompted to authorize the connection of this device to his home network, such as the WiFi (Wireless Fidelity) network generated by his home gateway, such as a Livebox®, for example. When the device authorized to connect to the home network of the user also belongs to the user, this does not pose a security or confidentiality problem.

When the device that it is desired to connect belongs not to the user of the home network but to a visitor, it is desirable for this device to connect via another network in order to preserve the security and confidentiality of information that may be retrieved via the home network, and in particular the confidentiality of the code for accessing the home network when the latter is a wireless network. Thus, some home gateways make it possible to create a visitor home network that is separate from the home network and thus enables the connection of devices not belonging to the user of the home gateway.

Just as portable devices and the dematerialization of content have evolved, connected home devices are increasing in number. It is thus common for television sets or other HiFi (High Fidelity) systems to be connected to the Internet via the home gateway and to form parts of the home network.

In order to facilitate the connection of these various connected devices and home devices to the home network, a multimedia device has been created.

Figure 1:
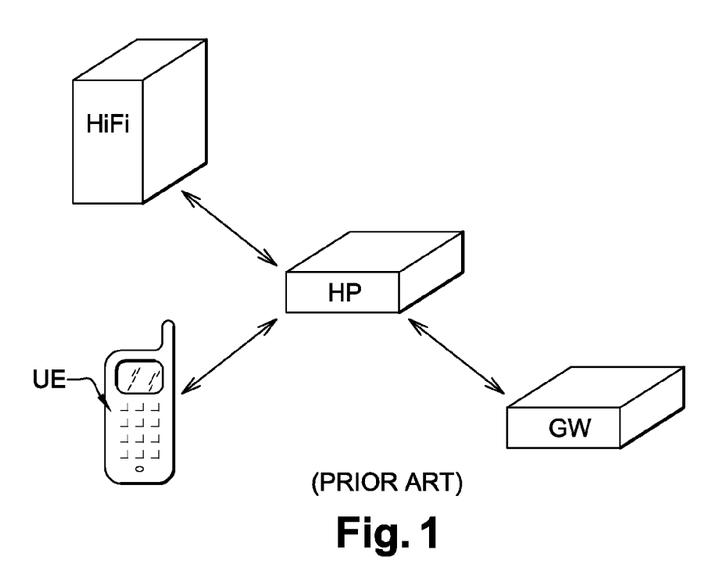
FIG. 1 shows a home network comprising a home gateway and a multimedia device, to which other devices are connected.

Such a multimedia device is connected to the home gateway, makes it possible to create a visitor network that is separate from the home network and enables the connection of connected home devices. Such a multimedia device HP is shown in FIG. 1. The multimedia device HP is connected to a home gateway GW, either in a wired fashion, with the aid of an Ethernet cable, for example, or by means of a wireless connection, of WiFi type, for example. The multimedia device HP may be situated in a different room than the home gateway and thus enable the connection of remote devices, such as for example the HiFi system, to the gateway.

The multimedia device HP may also generate a visitor WiFi network that is separate from the WiFi network generated by the home gateway. A device UE belonging to a visitor may thus connect to the visitor WiFi network and share multimedia content stored in a memory with one of the devices of the user that are connected to the multimedia device HP directly or via the home gateway GW.

Since such a multimedia device HP is able to perform numerous functions, it has a configuration module. The multimedia device HP comprises two interfaces making it possible to access the configuration module, one service interface to the home gateway GW and one terminal interface to the visitor devices UE.

The user of the multimedia device HP is able to access the configuration module of the multimedia device HP securely via the home gateway GW. Specifically, a device of the user making it possible to access the configuration module of the multimedia device also connected to the home gateway GW accesses this configuration module securely, the home gateway GW having authenticated the device of the user and the multimedia device HP.

If the multimedia device HP is used in a roaming situation, that is to say it is no longer connected to the home gateway GW, it is impossible for the user of the multimedia device to access the configuration module of the multimedia device HP.

One of the aims of the invention is to overcome drawbacks of the prior art by providing a solution enabling secure access to the configuration module of the multimedia device when the service interface is unusable.

To this end, the invention provides a method for configuring a multimedia device intended to be connected to an interconnection device with which it is authenticated, and to at least one terminal, said multimedia device including a service interface to the interconnection device and a terminal interface to said terminal, characterized in that it includes, in the course of an initialization phase:

a step of receiving, through the service interface, a first request sent by the terminal to obtain an identification parameter authorizing access to a configuration module of the multimedia device, said terminal being authenticated with the interconnection device, a step of transmitting, through the service interface, a message to the terminal comprising the requested identification parameter, and in that it includes, in the course of a phase of configuring the multimedia device:

a step of identifying the interface by which a second request sent by the terminal to access the configuration module is received, when the second request is received through the terminal interface, a step of sending, through the terminal interface, a third request, to the terminal, to transmit the identification parameter, a step of receiving, through the terminal interface, a message sent by the terminal comprising said identification parameter.

A multimedia device is connected to an interconnection device, such as a home gateway. In the course of the establishment of the connection between the interconnection device and the multimedia device, the multimedia device authenticates itself with the interconnection device. A terminal, such as a mobile terminal or a tablet, for example, is also connected to the interconnection device. In the course of the establishment of the connection between the interconnection device and the terminal, the terminal authenticates itself with the interconnection device.

A trust relationship is thus established between the interconnection device and the multimedia device and between the interconnection device and the terminal, enabling the exchange of sensitive information such as identification parameters, for example.

The method that is the subject of the invention enables a user of a terminal to access, automatically and securely, a configuration module of the multimedia device.

Specifically, the multimedia device comprises two interfaces through which it is able to exchange messages with other devices. The first interface, termed service interface, makes it possible to exchange messages with the interconnection device. The second interface, termed terminal interface, enables the multimedia device to exchange messages with terminals. In the course of the establishment of a connection between the multimedia device and the terminal, the terminal does not authenticate itself with the multimedia device.

Thus, in order to enable the user of a terminal to access the configuration module of the multimedia device securely through the service interface, for example when the multimedia device is in a roaming situation, that is to say when it is not connected to the interconnection device, the terminal must beforehand request identification parameters making it possible to access the configuration module of the multimedia device through the terminal interface.

The terminal requests the identification parameters making it possible to access the configuration module of the multimedia device via the interconnection device. Since the interconnection device is connected securely both to the multimedia device and to the terminal, the multimedia device transfers the requested identification parameters.

When the terminal dispatches a request for the purpose of accessing the configuration module of the multimedia device through the terminal interface, the multimedia device requests the transmission of the identification parameters received by the terminal. Once these parameters have been provided, the terminal is able to access the configuration module of the multimedia device securely.

Such a method is transparent for the user, as all of the exchanges are performed automatically between the various devices involved. Likewise, such a method enables any terminal to connect to the multimedia device, but only a terminal possessing identification parameters enabling access to the configuration module of the multimedia device is able to configure the latter.

The invention also relates to a method for communicating between a terminal and a multimedia device, said multimedia device including a terminal interface to said terminal, characterized in that it includes, in the course of an initialization phase:
a step of sending, to the multimedia device, a first request to obtain an identification parameter authorizing access to a configuration module of the multimedia device, said first request being transmitted to the multimedia device via an intermediate device to which said multimedia device is connected,
a step of receiving a message sent by the multimedia device comprising the requested identification parameter, said message being transmitted to the terminal via the intermediate device to which said terminal is connected, and in that it includes, in the course of a phase of configuring the multimedia device:
a step of sending, to the multimedia device, a second request to access the configuration module, said second request being received through the terminal interface,
a step of receiving a third request to transmit the identification parameter sent by the multimedia device,
a step of sending a sent message comprising said identification parameter, said message being received through the terminal interface.

Another subject of the invention relates to a multimedia device intended to be connected to an interconnection device with which it is authenticated, and to at least one terminal, said multimedia device including a service interface to the interconnection device and a terminal interface to said terminal, characterized in that it includes:
a receiver connected to the service interface, intended to receive a first request sent by the terminal to obtain an identification parameter authorizing access to a configuration module of the multimedia device, said terminal being authenticated with the interconnection device,
a transmitter connected to the service interface, intended to send a message to the terminal comprising the requested identification parameter,
an interface identification module by which a second request sent by the terminal to access the configuration module is received,
a transmitter connected to the terminal interface, intended to send a third request, to the terminal, to transmit the identification parameter,
a receiver connected to the terminal interface, intended to receive a message sent by the terminal comprising said identification parameter.

Finally, the invention relates to a terminal intended to communicate with a multimedia device, said multimedia device including a terminal interface to said terminal, characterized in that it includes:
a transmitter, to the multimedia device, of a first request to obtain an identification parameter authorizing access to a configuration module of the multimedia device, said first request being transmitted to the multimedia device via an intermediate device to which said multimedia device is connected,
a receiver of a message sent by the multimedia device comprising the requested identification parameter, said message being transmitted to the terminal via the intermediate device to which said terminal is connected,
a transmitter, to the multimedia device, of a second request to access the configuration module, said second request being received through the terminal interface,
a receiver of a third request to transmit the identification parameter sent by the multimedia device,
a transmitter of a sent message comprising said identification parameter, said message being received through the terminal interface.

According to other aspects, the invention also relates to computer programs comprising program code instructions for implementing the steps of the method for configuring a multimedia device and the communication method that are described above when these programs are executed by a computer.

Each of the computer programs described hereinabove may use any programming language, and be in the form of source code, object code or intermediate code between source code and object code, such as in a partially compiled form, or in any other desirable form.

The invention is also aimed at a computer-readable recording carrier on which a computer program such as described above is recorded.

The information carrier may be any entity or device capable of storing the program. For example, the carrier may include a storage means, such as a ROM (for "Read Only Memory"), for example a CD-ROM or a microelectronic circuit ROM, or else a magnetic recording means, for example a floppy disk or a hard disk.

On the other hand, the information carrier may be a transmissible carrier such as an electrical or optical signal, which may be routed via an electrical or optical cable, by radio or by other means. The program according to the invention may in particular be downloaded from a network of Internet type.

Alternatively, the information carrier may be an integrated circuit in which the program is incorporated, the circuit being designed to execute or to be used in the execution of the method in question.

Figure 2:
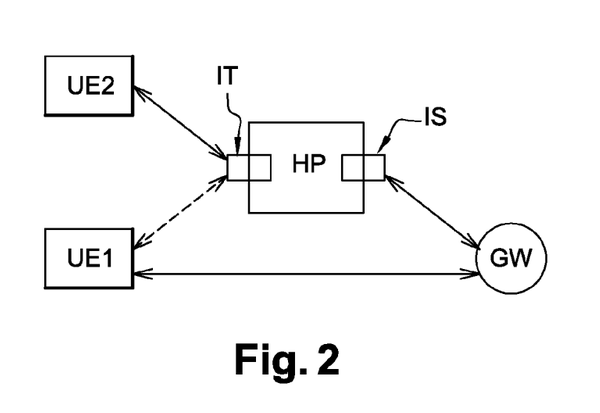
FIG. 2 shows a home communication network in which the method that is the subject of the invention is implemented.

Other features and advantages will become apparent on reading embodiments described with reference to the drawings, in which:

FIG. 2 shows a home communication network comprising a plurality of interconnected devices. Such a home network comprises a home gateway GW making it possible to connect the home network to the network of a telecommunications operator via a wired or radio access network.

A multimedia device HP is connected to the home gateway GW, either by means of a wired connection, such as an Ethernet cable, or by means of a wireless connection, of WiFi type, for example, through a service interface IS. Such a multimedia device HP incorporates a plurality of functionalities, such as the generation of what is termed a visitor WiFi network, separate from the WiFi network that may be generated by the home gateway GW, the inductive recharging of mobile telephone batteries, etc. The multimedia device HP also comprises various types of connectors such as USB (Universal Serial Bus) ports, or else HDMI (High Definition Multimedia Interface) sockets, which make it possible to connect various devices, such as USB flash drives or television sets, to the multimedia device HP.

The connection established between the home gateway GW and the multimedia device HP is a secure connection. When the connection between these two devices is of wired type, the security of this connection is ensured by the wired and therefore point-to-point nature of the wired connection. When the connection between these two devices is a WiFi connection, the multimedia device HP must be authenticated with the home gateway GW in order to be able to establish the connection to the home gateway GW. To this end, a security code, such as a WAP (Wireless Application Protocol) key or a WEP (Wind Equivalent Privacy) key, is input through a user interface of the multimedia device IIP and transmitted to the home gateway GW in order to finalize the connection to the multimedia device HP.

A first terminal UE1 is also connected to the home gateway GW, either by means of a wired connection, such as an Ethernet cable, or by means of a wireless connection, depending on the nature of the terminal UE1. For example, if the terminal UE1 is a desktop computer, the connection to the home gateway GW is a wired connection; and if the terminal UE1 is a smartphone or a tablet, the connection to the home gateway GW is a wireless connection. Just as for the connection established between the multimedia device HP and the home gateway GW, the connection established between the home gateway GW and the terminal UE1 is a secure connection.

A second terminal UE2, such as a smartphone, is connected to the multimedia device HP via a visitor WiFi network generated by the multimedia device HP and through a terminal interface IT. The connection established between the terminal UE2 and the multimedia device HP may be secure or unsecured. Once it is connected to the multimedia device HP, the terminal UE2 is able to exchange data, such as for example multimedia data, with a terminal connected to the home network or directly with the multimedia device HP.

The multimedia device HP may also operate in a roaming situation, i.e. without being connected to a home gateway GW. In such a situation, the multimedia device HP is not connected to the network of a telecommunications operator. The multimedia device HP may nevertheless generate a visitor WiFi network and thus enable the exchange of data between various terminals connected to the multimedia device HP through the terminal interface IT.

The multimedia device HP includes a configuration module that enables the user to configure various parameters linked to certain functions that the multimedia device HP is able to execute. For example, it is possible to configure the parameters relating to the visitor WiFi network generated by the multimedia device HP, such as the password required to connect to this visitor WiFi network.

When they are both connected to the home gateway GW, the terminal UE1 is able to access the configuration module of the multimedia device HP in order to configure the various operating parameters of the multimedia device HP. This is possible because the terminal UE1 and the multimedia device HP are connected securely to the home gateway GW. The terminal UE1 is thus able to access, through the home gateway GW, and therefore through the service interface IS, the configuration module of the multimedia device HP.

Figure 3:
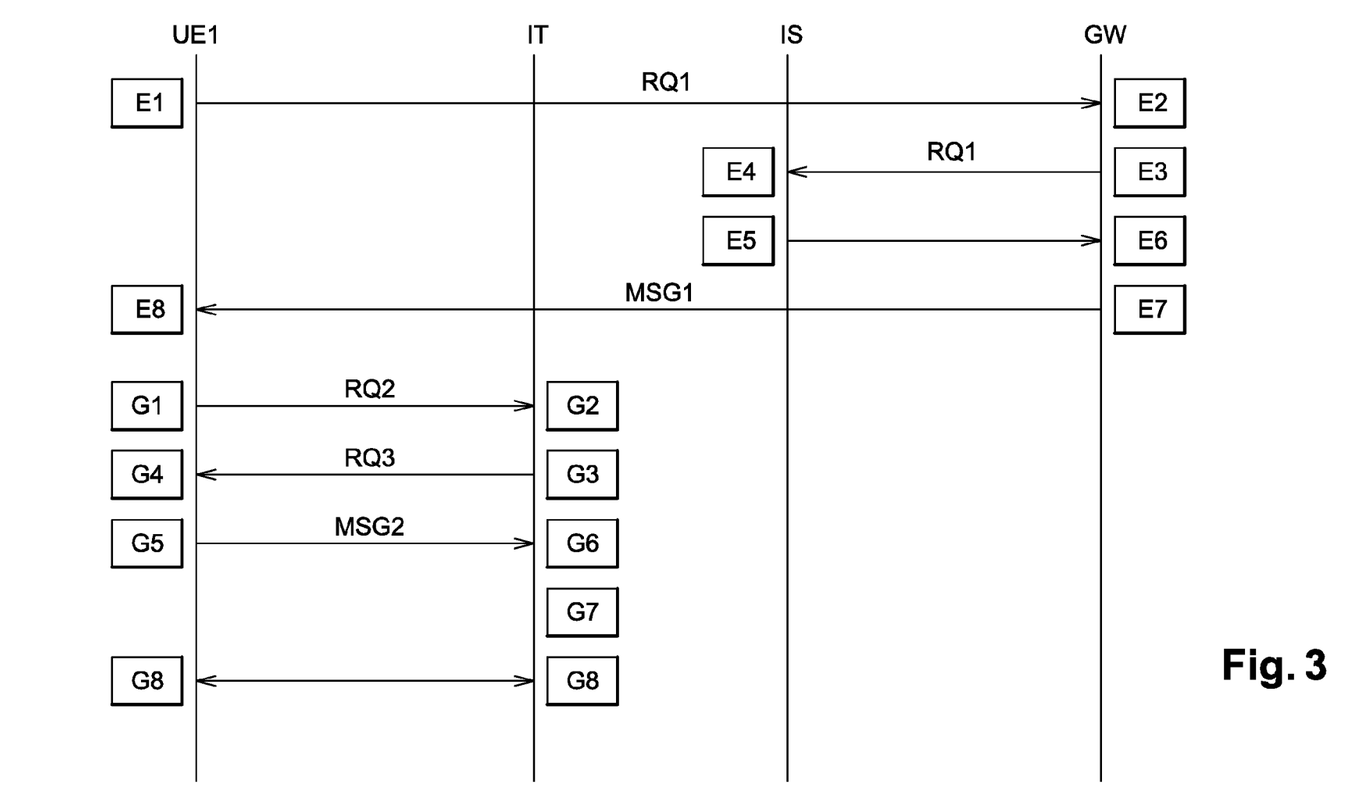
FIG. 3 shows the steps of a method for configuring the multimedia device.

FIG. 3 shows the steps of a method for configuring the multimedia device when the terminal UE1 is able to access the multimedia device HP only through the terminal interface IT, that is to say via the visitor WiFi network. The configuration method comprises two phases: an initialization phase and a configuration phase.

In the course of the initialization phase, the terminal UE1 and the multimedia device are both connected to the home gateway GW.

In a step E1, the terminal UE1 sends, to the intermediate device HP, a first request RQ1 to obtain an identification parameter authorizing access to the configuration module of the multimedia device HP. The request RQ1 is intercepted by the home gateway GW in the course of a step E2.

The home gateway GW then transmits the request RQ1 to the multimedia device HP in the course of a step E3.

In the course of a step E4, the multimedia device HP receives, through the service interface IS, the request RQ1 sent by the terminal UE1 to obtain an identification parameter authorizing access to the configuration module of the multimedia device HP.

With the request RQ1 having been received through the service interface IS, that is to say by means of a secure connection, the multimedia device HP is authorized to respond to this request RQ1.

Thus, in the course of a step E5, the multimedia device HP sends, through the service interface IS, a message MSG1 to the terminal UE1 comprising the requested identification parameter.

The message MSG1 is intercepted by the home gateway GW in the course of a step E6.

The home gateway GW then transmits the message MSG1 comprising the requested identification parameter to the terminal UE1 in the course of a step E7.

After reception of the message MSG1 by the terminal UE1, the requested identification parameter is stored in a memory of the terminal UE1 for the purpose of a subsequent use in the course of a step E8.

In the course of the configuration phase, the multimedia device is in a roaming situation, that is to say it is not connected to the home gateway GW. In this specific case, the terminal UE1 and the multimedia device are connected to each other through the visitor WiFi network generated by the multimedia device HP. In another embodiment of the invention, the multimedia device HP is connected to the home gateway GW but the terminal UE1 is connected to the multimedia device HP via the visitor WiFi network generated by the multimedia device HP.

Thus, in the course of a step G1, the terminal UE1 sends, to the multimedia device HP, a second request RQ2 to access the configuration module of the multimedia device HP.

In the course of a step G2, the multimedia device HP identifies the interface through which it has received the request RQ2.

When the multimedia device HP identifies that the request RQ2 has been received through the terminal interface IT, the multimedia device HP sends, through the terminal interface IT, a third request RQ3, to the terminal UE1, to transmit the identification parameter in the course of a step G3.

In the course of a step G4, the terminal UE1 receives the third request RQ3 to transmit the identification parameter sent by the multimedia device.

In the course of a step G5, the terminal UE1 sends, to the multimedia device HP, a message MSG2 comprising said identification parameter stored beforehand in a memory of the terminal UE1.

The message MSG2 comprising said identification parameter is received by the multimedia device HP though the terminal interface IT in the course of a step G6.

In the course of a step G7, the multimedia device HP identifies the terminal UE1 by means of the identification parameter and authorizes the terminal UE1 to access its configuration module.

In the course of a step G8, the terminal UE1 and the multimedia device exchange configuration data input through a user interface of the multimedia device HP that is displayed on a screen of the terminal UE1.

Such a configuration method makes it possible to restrict access to the configuration module of the multimedia device HP only to those terminals having obtained an identification parameter delivered by the multimedia device HP through the home gateway. Any terminal UE2 connecting to the visitor WiFi network generated by the multimedia device HP is thus denied access to the configuration module of the multimedia device HP.

Figure 4:
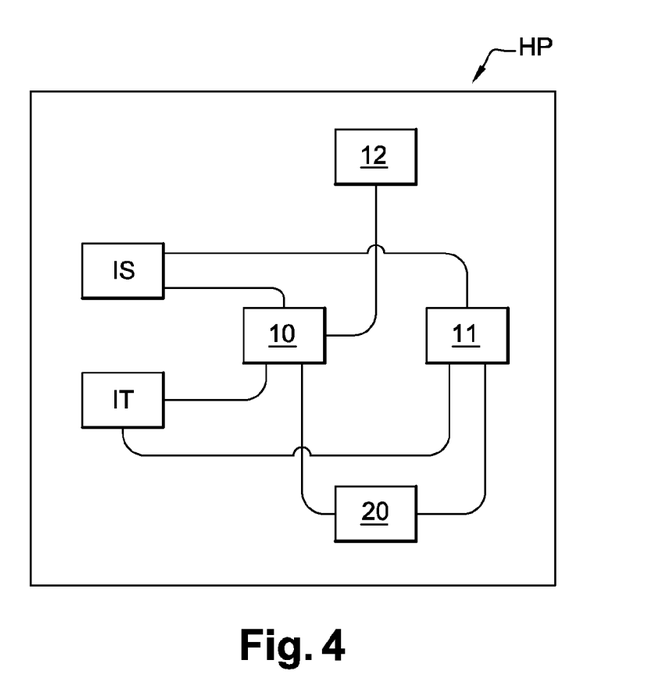
FIG. 4 shows a multimedia device able to implement the method that is the subject of the invention.

FIG. 4 shows a multimedia device HP able to implement the method that is the subject of the invention.

The multimedia device HP is intended to be connected to a home gateway GW with which it is authenticated through a service interface IS, and to at least one terminal UE1, UE2, through a terminal interface IT.

The multimedia device HP comprises a receiver 10 connected to the service interface IS, intended to receive a first request sent by the terminal UE1 to obtain an identification parameter authorizing access to a configuration module 20 of the multimedia device HP.

The multimedia device HP comprises a transmitter 11 connected to the service interface IS, intended to send a message to the terminal UE1 comprising the requested identification parameter.

The multimedia device HP comprises an identification module 12 for the interface by which a second request sent by the terminal UE1 to access the configuration module is received. The identification module 12 is connected to the receiver 10.

The transmitter 11 is also connected to the terminal interface IT, and makes it possible to send a third request, to the terminal UE1, to transmit the identification parameter.

The receiver 10 is also connected to the terminal interface IT, and makes it possible to receive a message sent by the terminal UE1 comprising said identification parameter.

The configuration module 20 is connected to the receiver 10 and to the transmitter 11.

Figure 5:
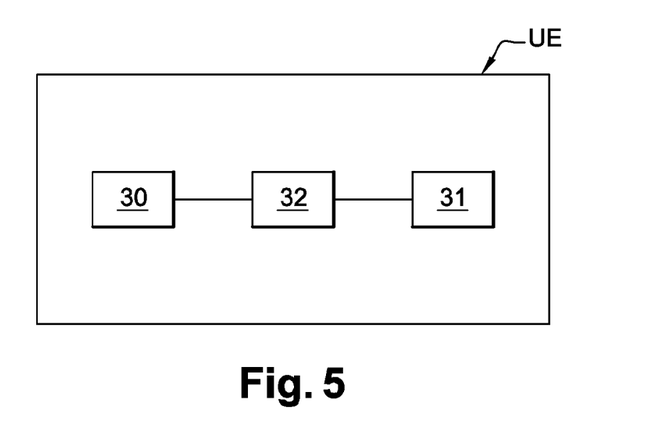
FIG. 5 shows a terminal able to implement the method that is the subject of the invention.

FIG. 5 shows a terminal UE1 able to implement the method that is the subject of the invention.

The terminal UE1 is intended to communicate with the multimedia device HP.

The terminal UE1 comprises a transmitter 30 making it possible to send a first request to the multimedia device HP to obtain one.

The terminal UE1 comprises a receiver 31 making it possible to receive a message sent by the multimedia device HP comprising the requested identification parameter.

The terminal UE1 comprises, connected to the transmitter 30 and to the receiver 31, a memory 32 in which the identification parameter authorizing access to a configuration module of the multimedia device HP is intended to be stored.

The invention claimed is:

1. A method for configuring a multimedia device configured to be connected to a home gateway with which the multimedia device is authenticated, and to a visitor communication terminal, the multimedia device including a service interface to the home gateway and a terminal interface to the visitor communication terminal, the method comprising:
receiving, through the service interface, a first request sent by the visitor communication terminal and routed by the home gateway to obtain an identification parameter authorizing access to a configuration module of the multimedia device, the configuration module enabling configuration of one or more parameters of the multimedia device, the visitor communication terminal being authenticated with the home gateway,
transmitting, through the service interface and via the home gateway, a message to the visitor communication terminal comprising the requested identification parameter,
identifying whether a second request sent by the visitor communication terminal to access the configuration module is received through the service interface or through the terminal interface; and
upon identification that the second request was received through the terminal interface:
sending to the visitor communication terminal a third request through the terminal interface to transmit the identification parameter, and
receiving, through the terminal interface, a message sent by the visitor communication terminal comprising the identification parameter.

2. The method of claim 1, wherein at least one of the multimedia device and the visitor communication terminal is not connected to the interconnection device at the time of sending of the second request by the visitor communication terminal.

3. The method of claim 1, wherein the multimedia device operates in a roaming mode at the time of sending of the second request by the visitor communication terminal.

4. A method of communication between a visitor communication terminal and a multimedia device, the multimedia device including a terminal interface to the visitor communication terminal, the method comprising:
   sending, to the multimedia device, a first request to obtain an identification parameter authorizing access to a configuration module of the multimedia device, the configuration module enabling configuration of one or more parameters of the multimedia device, the first request being transmitted to the multimedia device via a home gateway to which the multimedia device is connected and with which both the visitor communication terminal and the multimedia device are authenticated;
   receiving a message sent by the multimedia device comprising the requested identification parameter, the message being transmitted to the visitor communication terminal via the home gateway;
   sending, to the multimedia device, a second request to access the configuration module, the second request being transmitted to the multimedia device through the terminal interface;
   receiving through the terminal interface a third request to transmit the identification parameter sent by the multimedia device; and
   sending a message comprising the identification parameter to the multimedia device, the message being transmitted to the multimedia device through the terminal interface.

5. The method of claim 4, wherein at least one of the multimedia device and the visitor communication terminal is not connected to the home gateway at the time of sending of the second request by the visitor communication terminal.

6. The method of claim 4, wherein the multimedia device operates in a roaming mode at the time of sending of the second request by the visitor communication terminal.

7. A multimedia device configured to be connected to a home gateway with which the multimedia device is authenticated, and to a visitor communication terminal, the multimedia device including a service interface to the home gateway and a terminal interface to the visitor communication terminal, the multimedia device comprising:
   a first receiver connected to the service interface, the first receiver configured to receive a first request sent by the visitor communication terminal and routed by the home gateway to obtain an identification parameter authorizing access to a configuration module of the multimedia device, the configuration module enabling configuration of one or more parameters of the multimedia device, the visitor communication terminal being authenticated with the home gateway;
   a first transmitter connected to the service interface, the first transmitter configured to send, through the service interface and via the home gateway, a message to the visitor communication terminal comprising the requested identification parameter;
   an interface identification module configured to identify whether a second request sent by the visitor communication terminal to access the configuration module is received through the service interface or through the terminal interface;
   a second transmitter connected to the terminal interface, the second transmitter configured, upon an identification that the second request was received through the terminal interface, to send a third request, to the visitor communication terminal, to transmit the identification parameter; and
   a second receiver connected to the terminal interface, the second receiver configured to receive a message sent by the visitor communication terminal comprising the identification parameter.

8. A visitor communication terminal configured to communicate with a multimedia device, the multimedia device including a terminal interface to the communication terminal, the visitor communication terminal comprising:
   a transmitter configured to transmit to the multimedia device a first request to obtain an identification parameter authorizing access to a configuration module of the multimedia device, the configuration module enabling configuration of one or more parameters of the multimedia device, the first request being transmitted to the multimedia device via a home gateway to which the multimedia device is connected and with which both the visitor communication terminal and the multimedia device are authenticated; and
   a receiver configured to receive a message sent by the multimedia device comprising the requested identification parameter, the message being transmitted to the visitor communication terminal via the home gateway;
   the transmitter further configured to transmit to the multimedia device a second request to access the configuration module, the second request being transmitted to the multimedia device through the terminal interface,
   the receiver further configured to receive a third request to transmit the identification parameter sent by the multimedia device,
   the transmitter further configured to transmit a message comprising the identification parameter to the multimedia device, the message being transmitted to the multimedia device through the terminal interface.

9. A non-transitory computer-readable medium having stored thereon instructions which, when executed by a processor, cause the processor to perform a method for configuring a multimedia device configured to be connected to a home gateway with which the multimedia device is authenticated, and to a visitor communication terminal, the multimedia device including a service interface to the home gateway and a terminal interface to the visitor communication terminal, the method comprising:
   receiving, through the service interface, a first request sent by the visitor communication terminal and routed by the home gateway to obtain an identification parameter authorizing access to a configuration module of the multimedia device, the configuration module enabling configuration of one or more parameters of the multimedia device, the visitor communication terminal being authenticated with the home gateway,
   transmitting, through the service interface and via the home gateway, a message to the visitor communication terminal comprising the requested identification parameter,
   identifying whether a second request sent by the visitor communication terminal to access the configuration module is received through the service interface or through the terminal interface; and
   upon identification that the second request g received through the terminal interface:

sending to the visitor communication terminal a third request through the terminal interface to transmit the identification parameter, and receiving, through the terminal interface, a message sent by the visitor communication terminal comprising the identification parameter.

10. The non-transitory computer-readable medium of claim 9, wherein at least one of the multimedia device and the visitor communication terminal is not connected to the home gateway at the time of sending of the second request by the visitor communication terminal.

11. The non-transitory computer-readable medium of claim 9, wherein the multimedia device operates in a roaming mode at the time of sending of the second request by the visitor communication terminal.

12. A non-transitory computer-readable medium having stored thereon instructions which, when executed by a processor, cause the processor to perform a method of communication between a visitor communication terminal and a multimedia device, the multimedia device including a terminal interface to the visitor communication terminal, the method comprising:

sending, to the multimedia device, a first request to obtain an identification parameter authorizing access to a configuration module of the multimedia device, the configuration module enabling configuration of one or more parameters of the multimedia device, the first request being transmitted to the multimedia device via a home gateway to which the multimedia device is connected and with which both the visitor communication terminal and the multimedia device are authenticated;

receiving a message sent by the multimedia device comprising the requested identification parameter, the message being transmitted to the visitor communication terminal via the home gateway;

sending, to the multimedia device, a second request to access the configuration module, the second request being transmitted to the multimedia device through the terminal interface;

receiving a third request to transmit the identification parameter sent by the multimedia device; and sending a message comprising the identification parameter to the multimedia device, the message being transmitted to the multimedia device through the terminal interface.

13. The non-transitory computer-readable medium of claim 12, wherein at least one of the multimedia device and the visitor communication terminal is not connected to the home gateway at the time of sending of the second request by the visitor communication terminal.

14. The non-transitory computer-readable medium of claim 12, wherein the multimedia device operates in a roaming mode at the time of sending of the second request by the visitor communication terminal.

* * * * *